(12) United States Patent
Le et al.

(10) Patent No.: US 7,028,094 B2
(45) Date of Patent: Apr. 11, 2006

(54) DATA COMMUNICATION METHOD, SYSTEM, AND TRANSMITTER AND RECEIVER CONSTITUTING THE SYSTEM

(75) Inventors: Khiem Le, Coppell, TX (US); Yogesh Swami, Irving, TX (US); Naveen Kakani, Irving, TX (US)

(73) Assignee: Nokia Corporation, Espoo (FI)

( * ) Notice: Subject to any disclaimer, the term of this patent is extended or adjusted under 35 U.S.C. 154(b) by 570 days.

(21) Appl. No.: 10/212,796

(22) Filed: Aug. 7, 2002

(65) Prior Publication Data

US 2004/0030790 A1 Feb. 12, 2004

(51) Int. Cl.
*G06F 15/16* (2006.01)

(52) U.S. Cl. ....................... 709/230; 714/749
(58) Field of Classification Search ................. 709/230, 709/223; 714/749
See application file for complete search history.

(56) References Cited

U.S. PATENT DOCUMENTS

| | | | | |
|---|---|---|---|---|
| 6,519,644 B1 | * | 2/2003 | Lindquist et al. | 709/227 |
| 6,591,382 B1 | * | 7/2003 | Molloy et al. | 714/704 |
| 6,611,495 B1 | * | 8/2003 | Meyer et al. | 370/230.1 |

FOREIGN PATENT DOCUMENTS

WO    WO 00/57666    9/2000

OTHER PUBLICATIONS

International Search Report for PCT/IB 03/03170 dated Nov. 13, 2003.
Balakrishnan, H., et al.: "A Comparison of Mechanisms for Improving TCP Performance over Wireless Links", IEEE/ACM Transactions on Networking, IEEE, vol. 5, No. 6, Dec. 1997, pp. 756–769, XP00034405, ISSN: 1063–6692.

3 GPP TSG Services and System Aspects: "QoS Concept and Architecture (Release 5)", 3GPP TS 23.107 V5.3.0, XX, XX, Jan. 2002, pp. 1–39, XP002241582.
Gjani, N., et al.: "TCP/IP Enhancements for Satellite Networks", IEEE Communications Magazine, IEEE Service Cente, Piscataway, N.J., US, vol. 37, No. 7, Jul. 1999, pp. 64–72, XP00083506, ISSN:0163–6804.
Tamura, Y., et al.: "EFR: a Retransmit Scheme for TCP in Wireless LAN's ", Local Computer Networks, 1998. LCN '98., Proceedings. $23^{rd}$ Annual Conference on Lowell, MA, USA Oct. 11–14, 1998, Los Alamitos, CA, USA, IEEE, Comput. Soc, US, Oct. 11, 1998, pp. 2–11, XP010310372, ISBN: 0–8186–8810–6.

(Continued)

*Primary Examiner*—David Y. Eng
(74) *Attorney, Agent, or Firm*—Squire, Sanders & Dempsey LLP

(57) ABSTRACT

The present invention concerns a data communication method for communicating packetized data via an interface between a transmitter and a receiver, wherein communication relies on a layered communication protocol stack comprising at least two protocol layers of different hierarchy level, wherein at least data communication on a lower one of the layers adopts a retransmission scheme for data packets for which an acknowledgment of receipt was not received at the transmitter, the method comprising the steps of initializing the retransmission scheme of the lower one of the layers by setting a condition parameter, wherein fulfilling the condition defined by the condition parameter represents an indication as to how to control the retransmission scheme, wherein initializing comprises setting said condition parameter of the lower one of the layers according to information forwarded from the higher one of said layers to the lower one of said layers, transmitting packet data from the transmitter via the interface to the receiver according to the retransmission scheme of the lower one of the layers, detecting that the condition is fulfilled during transmitting, and controlling said retransmission scheme of the lower one of said layers in response to the detecting.

19 Claims, 8 Drawing Sheets

OTHER PUBLICATIONS

Yong, Bai, et al.: "Interactions of TCP and Radio Link ARQ Protocol", Vehicular Technology Conference, 1999., VTC 1999 –Fall., IEEEE VTS 50$^{th}$ Amsterdam, Netherlands Sep. 19–22, 1999, Piscataway, NJ, USA, IEEE, US, Sep. 19, 1999, pp. 1710–1714, XP010353245, ISBN: 0–7803–5435–4.

Bakre, A., et al.: "Implementation and Performance Evaluation of Indirect TCP", IEEE Transactions on Computers, vol. 48, No. 3, Mar. 1997, pp. 260–278.

* cited by examiner

"Data To Mobile"

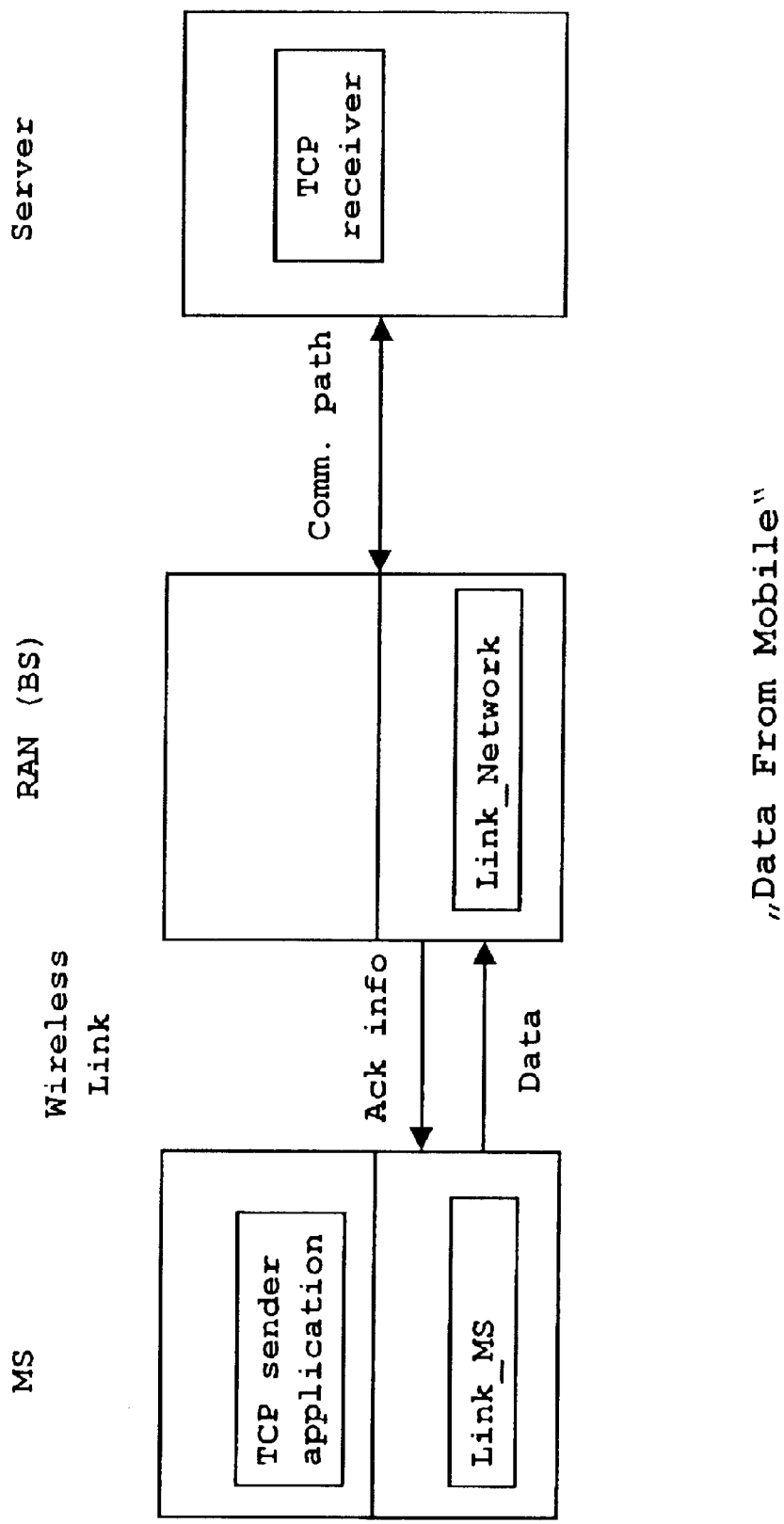
FIG. 2B "Data From Mobile"

"Data To Mobile", Alternative A

"Data To Mobile", Alternative B

"Data To Mobile", Alternative C

DATA COMMUNICATION METHOD, SYSTEM, AND TRANSMITTER AND RECEIVER CONSTITUTING THE SYSTEM

FIELD OF THE INVENTION

The present invention relates to a data communication method for communicating packetized data via an interface between a transmitter and a receiver. Also, the present invention relates to a correspondingly operated data communication system as well as to the corresponding receivers and transmitters as such which constitute the system.

BACKGROUND OF THE INVENTION

Although hereinafter the present invention will be described with a particular focus on specific communication systems and standards used therein, it is to be noted that any specifically mentioned aspect serves as a mere example only.

In detail, the communication method may rely on a wireless communication principle, but may also rely on a wirebound communication principle. Therefore, an interface involved in communication between a receiver and transmitter may for example be an air interface or a wired interface. Communication may rely on a TDMA (Time Divisional Multiple Access) or CDMA (Code Divisional Multiple Access) principle.

A receiver may likewise act as a transmitter and thus constitute a transceiver, while however only the receiver/transmitter aspect of the transceiver is individually highlighted in the description. Thus, a terminal such as a receiver/transmitter may for example be a mobile station MS (in case of a GSM (Global Standard for Mobile Communication) based communication system and/or method) or a user equipment UE (in case of a UMTS (Universal Mobile Telecommunications System). Nevertheless, also a server connected to a telecommunication network "connecting" the receiver/transmitter may act as a transmitter/receiver, while even a network entity such as a base station BS (in case of GSM based system/method) or a Node_B (in case of UMTS based system/method) (acting as a relay station between a transmitter and a receiver terminal may have at least partly receiver/transmitter properties as described in connection with the present invention.

A user using his terminal for data transmission runs an application on his terminal generating application data to be transmitted (note that a similar application may be run on a server). These application data are transmitted as packetized data. Such application packet data are transmitted using an application protocol. An application protocol is operated on top of a protocol stack, which protocol stack comprises plural individual stacked protocol layers adopted for such a transmission within a packet data network. Data communication between a sending/transmitting end and a receiving end relies for example on the OSI reference model (OSI= Open System Interconnection). Of course, other multiple protocol layer models may likewise be adopted in connection with the present invention still to be described. As is generally known, the OSI reference model splits the communication process between a transmitting and receiving end into seven independent layers. Layers of the same hierarchy at the sending and the receiving end share a common protocol, while a certain layer at one end also shares a protocol with the layers immediately above and below it for interlayer connection. However, the highest layer (layer 7, application layer) does not require to know any particulars of e.g. the lowest layer, layer 1, the physical layer. In brief, the seven layers of the OSI Basic Reference Model are (from bottom to top): The Physical Layer which describes the physical properties of the various communications media, as well as the electrical properties and interpretation of the exchanged signals, the Data Link Layer which describes the logical organization of data bits transmitted on a particular medium, the Network Layer which describes how a series of exchanges over various data links can deliver data between any two nodes in a network, the Transport Layer which describes the quality and nature of the data delivery, the Session Layer which describes the organization of data sequences larger than the packets handled by lower layers, the Presentation Layer which describes the syntax of data being transferred, and the Application Layer which describes "how real work actually gets done". As the OSI reference model is expected to be known to those skilled in the art, a more detailed explanation thereof is considered to be dispensable in the present application.

Thus, in a packet data network such as GSM based networks, the flow of user data is from the application layer at the mobile station MS via the protocol stacks (in "vertical direction") downwards to the layer 1, from there via the network entities to the receiver. The data flow from MS as transmitter, via network entities to the receiver is in "horizontal direction", and at the receiver, the data flow in turn will become "vertical" from layer 1 via intermediate layers up to the application layer.

On the application layer, applications are run. Examples for such applications are the wireless application protocol WAP, the session initiation protocol SIP, the real time protocol RTP, digital packet data DPD signaling, Hypertext Transfer Protocol HTTP, Transmission Control Protocol TCP or the like. It is to be noted that various applications currently known and/or even those to be developed can profit from the present invention as to be described hereinafter.

Packet data or packetized data as mentioned herein are also referred to as data segments. A segment is constituted by fragments which together form the segment. For example, as generally known, a packet/segment is constituted by a header as an initial fragment and the payload portion as a remaining fragment.

The subsequent description is focused on IP based transport layer protocols such TCP and RTP. Typically, most of these transport layer protocol assume that the bit error losses on links are small, and therefore there the link layer seldom provides any form of reliability. But in case of wireless networks, the link layer losses are much higher and therefore the link layer protocols employ their own loss recovery mechanism to mitigate these losses. Specifically, the mechanism employed is to use acknowledgments, negative acknowledgments, or a combination of these two to provide reliability. In contrast to TCP, these link layer protocols only provide reliability on an individual link, but do not provide end-to-end reliability. Example of such link layer protocol can be found in EDGE/GERAN links (EDGE=Enhanced Data rates for GSM Evolution, GERAN=GPRS EDGE RAN, GPRS=general packet radio service, RAN=radio access network).

Applications such as TCP send multiple packets into the network without waiting for individual packets to be acknowledged. In other words, a TCP sender might inject more than one packet at a time and does not necessarily have to wait to get the acknowledgment for each packet. However, if the TCP sender does not receive any acknowledgment within a certain period of time, it times out and retransmits all the data that were not acknowledged.

However, the link layer does not have any knowledge of the application to which these blocks belong, and the link layer might be transmitting the blocks even after the application itself has issued and forwarded a duplicate copy of the data to be sent or the segment is no longer of any use (for example a Real Time Packet arriving too late). This results in unnecessary retransmissions leading to a waste of bandwidth and/or an added delay.

Apart from the timeout based loss detection and recovery mechanism, most of the transport protocols have auxiliary methods to detect loss. As an example, TCP initiates its loss recovery by detecting three duplicate acknowledgments for the same block. A TCP receiver sends one or more duplicate acknowledgments to a TCP sender if it detects holes in its data stream. In other words, if the first packet gets lost in the stream of 10, the remaining nine packets will generate a duplicate acknowledgment for the first packet. A TCP sender waits for at least 3 duplicate acknowledgments before it retransmits the data packet. Please note that even with these three duplicate acknowledgments being generated, and if the TCP sender does not receive the acknowledgment, then the sender will finally timeout. This means, that if a timeout has occurred, then the three duplicate acknowledgments become a redundant and/or superfluous transmission.

Extending the previous example, if the number of data packets into the sender's buffer is less than or equal to 3 segments, then the TCP receiver will never be able to generate 3 duplicate acknowledgments. In these cases, the TCP sender can recover only after a timeout. Please note that TCP gradually increases the amount of data sent into the network. And therefore, if the wireless link goes bad at the start of the connection, then the sender will timeout. In addition, when the sender timeouts, it also reduces its estimate of network capacity and in these cases, the estimate could become as small as 2 packets. Reducing the estimate of network capacity can severely degrade the entire connection because the TCP sender increases its estimate of network capacity very slowly after a retransmission timeout.

Other transport layer protocols have mechanism similar to the above explained concept of 3 duplicate acknowledgments and timeouts to detect loss. Nevertheless, it is to be noted that 3 duplicates are just an example, and other protocols may use variants of this mechanism to achieve the same effect.

A. Bakre and B. R. Badrinath have recently proposed in "Implementation and Performance Evaluation of Indirect-TCP", IEEE Trans. Comp., Vol. 46, No. 3, March 1997, pp. 260–278, to split the original TCP connection into separate connections for the wired and wireless parts of the path, and use performance enhancing proxy servers. On the wireless part, a protocol optimized for error recovery may be used.

Drawbacks of that approach, however, include violation of the end-to-end TCP semantics, since acknowledgments may reach the sender before the data reaches its destination, and a significant overhead is caused by the back-to-back processing and considerable per-connection state maintenance.

SUMMARY OF THE INVENTION

Consequently, it is an object of the present invention to provide an improved data communication method for communicating packetized data via an interface between a transmitter and a receiver, a corresponding communication system as well as correspondingly adapted transmitters and receivers which are free from above mentioned drawbacks.

According to the present invention, the above object is for example achieved by a data communication method for communicating packetized data via an interface between a transmitter and a receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, the method comprising the steps of: initializing the retransmission scheme of the lower one of said layers by setting a condition parameter, wherein fulfilling the condition defined by the condition parameter represents an indication as to how to control the retransmission scheme, wherein initializing comprises setting said condition parameter of the lower one of said layers according to information forwarded from said higher one of said layers to said lower one of said layers, transmitting packet data from the transmitter via the interface to the receiver according to the retransmission scheme of said lower one of said layers, detecting that said condition is fulfilled during transmitting, and controlling said retransmission scheme of said lower one of said layers in response to said detecting.

According to favorable further developments said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received, said controlling comprises acknowledging receipt of the packet data and continuing transmission of the subsequent packet via the lower one of said layers, said controlling comprises determining to either abort or not the transmission via the lower one of said layers, and informing the higher one of said layers about a need for retransmission, said controlling comprises stopping additional (e.g. more than three) duplicate acknowledgments from reaching the application. The duplicate ack's could be from the mobile and also from the network.

Additionally, according to the present invention, the above object is for example achieved by a data communication system, comprising at least a transmitter and a receiver, and being adapted to communicate packetized data via an interface between said transmitter and said receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, wherein at the receiver side, the receiver is configured in terms of the retransmission scheme of the lower one of said layers by a set condition parameter, wherein fulfilling the condition defined by the condition parameter represents an indication as to how to control the retransmission scheme, and wherein said configured condition parameter of the lower one of said layers is set according to properties of said higher one of said layers, said transmitter is adapted to transmit packet data via the interface to the receiver according to the retransmission scheme of said lower one of said layers, said receiver comprises a detecting means adapted to detect that said condition is fulfilled during reception of transmitted packet data, and said receiver comprises a control means adapted to control said retransmission scheme of said lower one of said layers in response to an output of said detecting means.

According to favorable further developments said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received, said control means is adapted to acknowledge receipt of the packet data to thereby continue transmission of the subsequent packet data via the lower one of said layers, said control means is adapted to determine whether to abort transmission or not via the lower one of said layers, and inform the higher one of said layers about a need for retransmission, said control means is adapted to stop additional (e.g. more than three) duplicate acknowledgments from reaching the application.

Furthermore, according to the present invention, the above object is for example achieved by a receiver for use with a data communication system adapted to communicate packetized data via an interface between a transmitter and said receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, comprising configuration means adapted to configure the receiver in terms of the retransmission scheme of the lower one of said layers by a set condition parameter, wherein fulfilling the condition defined by the condition parameter represents an indication as to how to control the retransmission scheme, and wherein said configuration means is adapted to set said configured condition parameter of the lower one of said layers according to properties of said higher one of said layers, receiving means adapted to receive packet data transmitted from said transmitter via the interface to the receiver according to the retransmission scheme of said lower one of said layers, and detecting means adapted to detect that said condition is fulfilled during reception of transmitted packet data, and control means adapted to control said retransmission scheme of said lower one of said layers in response to an output of said detecting means.

According to favorable further developments said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received, said control means is adapted to acknowledge receipt of the packet data to the transmitter to thereby continue transmission of the subsequent packet data via the lower one of said layers, said control means is adapted to determine whether to abort transmission via the lower one of said layers, and inform the higher one of said layers about a need for retransmission, said control means is adapted to stop additional (e.g. more than three) duplicate acknowledgments from reaching the application.

Moreover, according to the present invention, the above object is for example achieved by a transmitter for use with a data communication system adapted to communicate packetized data via an interface between said transmitter and a receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, comprising receiving means adapted to receive a feedback from external, and control means adapted to control said retransmission scheme of said lower one of said layers in response to said received feedback.

According to favorable further developments said control means is adapted to continue transmission of the subsequent packet data via the lower one of said layers using said retransmission scheme, if the received feedback was a positive acknowledgment, said control means is adapted to abort transmission via the lower one of said layers, and perform retransmission on the higher one of said layers, if the received feedback indicates that the retransmission scheme on the lower layer is to be stopped, said control means is adapted to stop additional (e.g. more than three) duplicate acknowledgments from reaching the application.

By virtue of the present invention, basically the following advantages can be achieved due to the link layer knowing the start and end of higher layer data segments (i.e. header and fragment boundaries of segments) and the "important" parts of each frame as well as the information on condition parameters such as e.g. time-out values for detecting a lapse of a specified time (and others as mentioned above):

1. The unwanted retransmissions are avoided by defining an algorithm at the link layer in the terminal and the network side.
2. The proposed mechanism can be applied to any technology which works with a ACK/NACK and polling mechanisms for ACK/NACK. EDGE/GERAN is used as an example only to present a possible implementation scenario for the concept.
3. The invention minimizes the number of connection establishment attempts and hence improves the throughput of the connection instead of wasting the system bandwidth in accessing the channels and establishing the connection due to the fact that e.g. the timers that are used on link layer level are based on information obtained from the application layer level.
4. The method according to the invention is running on top of the existing solutions and thus uses the flexibility given in the standards to implement the polling algorithm to improve the performance of the system at e.g. the air interface.
5. There is no need to change standards, only implementation.
6. No loss of throughput caused by dropping the connection.
7. Higher reliability for essential/critical information, which is the header data.
8. Better usage of link resources can be achieved thanks to data segment awareness.

9. Transmission reliability is maximized by allowing the link level to retransmit upon errors, up to a certain condition to be detected, such as some time threshold, and to control the retransmission scheme of said lower one of said layers in response to said detecting, with the certain condition being informed from the higher layer (application layer) to the lower layer (link layer).
10. Link bandwidth is used more efficiently, because there is no duplication of link level and application level retransmission of the same data segment.
11. Throughput degradation is minimized by notifying the application level when the link level stops retransmission, so the application level can retransmit without timing out and without going to a degraded throughput state like slow start in TCP.
12. When applied to TCP, no change to TCP protocol is required. The end-to-end principle and semantics are preserved.
13. The proposed principle is applicable to GPRS, EDGE, CDMA2000 and WCDMA.
14. Dynamic adjustment of the number of retransmission attempts for each fragment of the segment can be accomplished.

(Note that some of the above advantages are achieved in specific embodiments only and are thus not necessarily present in each embodiment.)

This invention solves the problem of avoiding timeouts by generating events like 3 duplicates. Thus, by virtue of the presented algorithm according to the present invention, it is possible to minimize the chances of transport layer timeouts, but without changing the transport layer protocols itself. As a further optimization to this, the link layer may also discard the duplicate packets if it fails to avoid the timeout.

Also, the present invention proposes a concept wherein at least data communication on a lower layer is capable of generating events that could trigger loss recovery at the upper layer. In other words, if the link layer can detect that the upper layer protocol will timeout because the conditions required for auxiliary retransmission is not met, and the link layer itself cannot deliver the data by its own retransmission mechanism, then it tries to generate these auxiliary conditions. To extend out previous example, if the link layer detects that it has only 2 segments in its queue, then it can generate 3 duplicate acknowledgements directly to the sender if it detects loss and try to avoid loss. If these 3 duplicate acknowledgements are received appropriately in time, then the TCP sender will not have to timeout. However, if this was not done, the only way out for TCP sender would be to timeout and then retransmit.

BRIEF DESCRIPTION OF THE DRAWINGS

In the following, the present invention will be described in greater detail with reference to the accompanying drawings, in which.

DETAILED DESCRIPTION OF THE EMBODIMENTS

Figure 1:
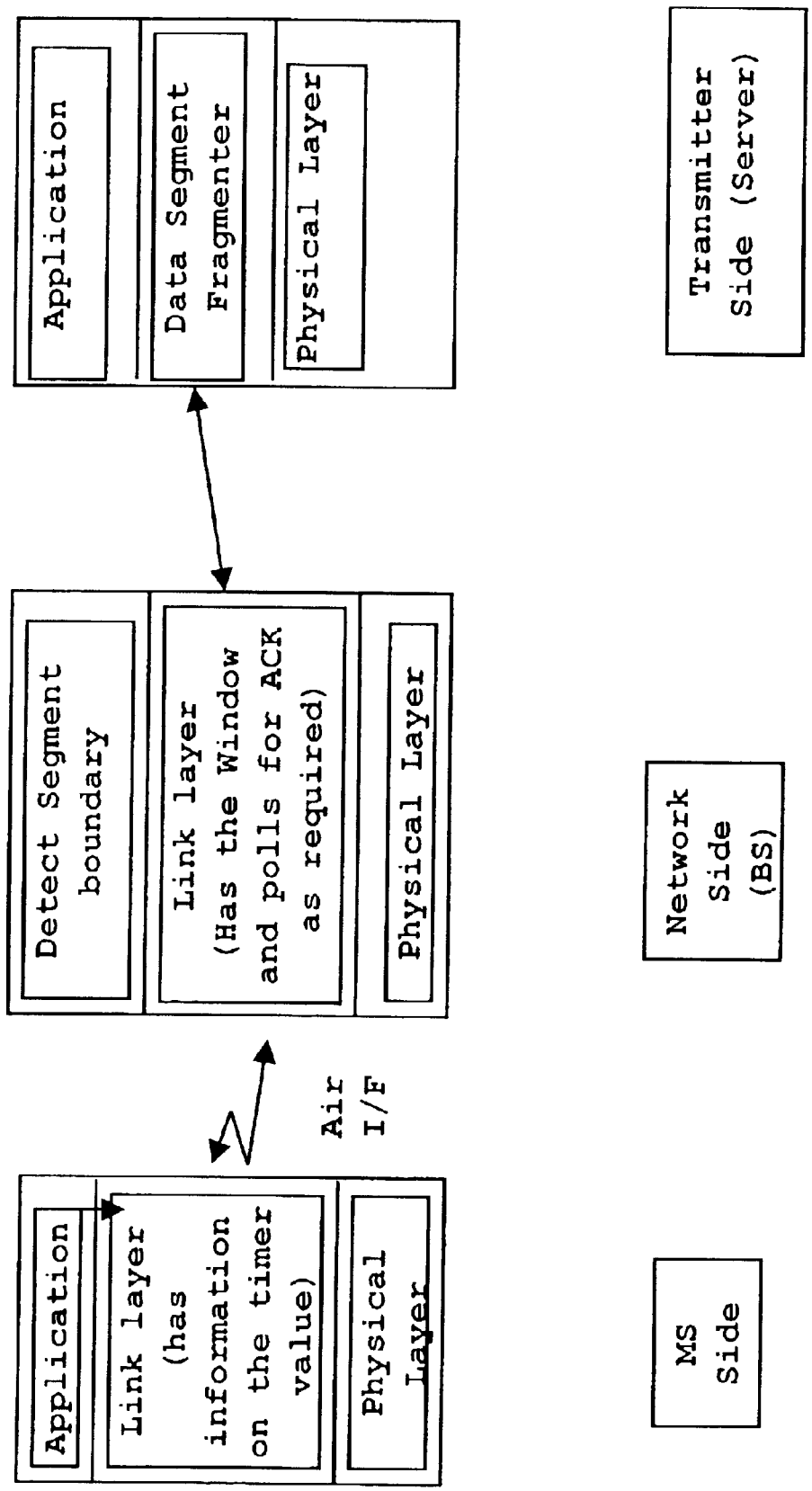
FIG. 1 shows the involved entities in a block diagram representation with some signaling involved, according to the present invention, and used to explain a first embodiment, FIGS. 2A and 2B, respectively, show a simplified block diagram of the entities shown in FIG. 1 for different transmission directions according to a second embodiment of the present invention, FIGS. 2C and 2D graphically illustrate timing relations in the calculation of timer values.

In FIG. 1, MS represents a Mobile Station (or more generally a terminal acting as a transmitter and/or receiver), and BS represents a Base Station, i.e. a network entity acting as a relay between the (receiving) terminal MS and a communication partner such as a (transmitting) server. The scenario considered in FIG. 1 is that the MS acts as the receiver and is receiving downloaded information from the data server acting as the transmitter. In general, the data flow is from the transmitter via the network (represented by the base station BS) and an air interface (between the BS and the MS) to the receiver.

It is to be noted that each device (receiver, transmitter and network entity) is roughly represented by its protocol stacks and functionalities implemented in the device. Also, of course the protocol stack is not shown in all details. Nevertheless, it will be clear to the attentive reader from the above overview over the OSI layer model that at least one intermediate protocol layer is present between the link layer and the application layer.

Data transfer on the physical layer is not of interest for the description of the present invention and therefore not described here. Rather, a focus of the description is laid on the link layer and the data transfer on this layer.

In this regard, an acknowledged mode of data transmission is used at the link layer (on the air interface between MS and BS). The application layer at the MS indicates at least one condition parameter such as e.g. a timer value to the link layer, or a parameter of the link condition (say the error probability of the link, i.e. the air interface), or the amount of data remaining to be sent/received, or the amount of offset in the sequence number tolerable, or a combination of these parameters and/or those mentioned earlier above. This is indicated by the arrow from the application layer to the link layer. The example of a BS is used for convenience, but the invention is not limited to only BS architecture, as mentioned above.

Thus, when the application layer informs the link layer (via the intermediate layers (not shown)) of the at least one condition parameter of the application layer (such as a time-out value and/or Round Trip Time RTT, etc.), initializing the retransmission scheme of the lower one of said layers by setting one or more condition parameters is performed. Note that fulfilling the condition defined by the condition parameter may represent an indication to stop performing the retransmission scheme. More generally, the specific condition defined by one or more condition parameters, when fulfilled, represents an indication for controlling the retransmission scheme of the lower layer in a specific manner. In particular, the initializing comprises setting said condition parameter of the lower one of said layers, wherein said setting is performed according to information forwarded from said higher one of said layers to said lower one of said layers.

At the network side, the sender should detect the data segment boundaries. This is accomplished by providing a data fragmenter functionality at the transmitter (server) and correspondingly a data segment boundary detecting functionality at the network entity BS. The sender (at the network side BS) sends a polling request after he sends the header (either compressed or uncompressed) and only upon a positive acknowledgment ACK of data, it sends the remaining part (the payload) of the data segment. At the receiver side the receiver has the knowledge of the time until which the current data segment could be transmitted. (This time represents an internal parameter for the retransmission loop performed for an individual fragment.) If no segment/fragment is received within this time, a negative acknowledgment is returned to the transmitter side and the segment/fragment is retransmitted. Thus, on the link layer as the lower layer, transmitting packet data from the transmitter via the interface to the receiver according to the retransmission scheme of said lower one of said layers is performed.

Simultaneously, while the receiver performs retransmission, the receiver monitors whether the condition (informed from the application layer) is fulfilled. This condition represents an externally informed parameter for the retransmission process indicating whether the whole retransmission process is to be stopped or otherwise controlled (dependent on the actually set and fulfilled condition). If the receiver detects that said condition is fulfilled during transmitting/retransmitting, he accordingly controls said retransmission scheme of said lower one of said layers in response to said detecting.

According to a first embodiment of the present invention, said controlling comprises acknowledging receipt of the packet data and continuing transmission of the subsequent packet via the lower one of said layers. Thus, for example according to the first embodiment of the present invention, in the case of EDGE/GERAN system, the terminal (when acting as a receiver) acknowledges the RLC blocks even though they are received in error, and on the network side the polling algorithm ensures that the data segment rate is optimized.

By sending an acknowledgment ACK to the radio blocks (segments/fragments) although they are received in error:
a) unnecessary transmission of data which would anyway be transmitted again or which are outdated (too old) is avoided.
b) the throughput at the air interface is increased, and
c) Unnecessary release of the link (due to predefined link timers) is avoided.

Thus, stated in other words, according to the first embodiment, based on a condition parameter informed from the higher (application) layer to the lower (link) layer, the retransmission scheme of the lower layer is controlled. Control is performed in such a way in this embodiment that the receipt of an erroneously (e.g. too late or unsuccessfully) received packet data is acknowledged, and the retransmission scheme of the lower layer is continued even though the fulfilled condition parameter would normally indicate that the retransmission scheme as a whole on the lower layer had to be stopped.

In detail, the application layer at the receiver sends the Application Time out Value for each segment to the link layer. That is, the condition parameter is informed per segment and may vary for segments of different applications. Also the link layer may have set conditions of the tolerable link error rate, amount of data remaining to be sent/received, available resources (system load) or a combination of the above conditions and/or those mentioned earlier above. Also, it is detected per segment whether the condition represented by the condition parameter (or condition parameters) is fulfilled or not. For example the application at the receiver using RTP sends the tolerable delay value to the receiver and the link layer has the estimate of the maximum frame error rate tolerable and the system load at which the required resources could still be available. In FIG. 1, the MS (receiver) knows that it is receiving a data segment. At the network side (BS) the sender knows the boundaries of the data segment that it is transmitting. For example, if TCP data is being sent then the sender knows the boundaries of the TCP segment.

In the acknowledged mode of data transmission on the link layer the following happens:

1. The transmitter sends the initial parts of the data segment which would be sufficient to recognize the segment (in the case of TCP, the TCP header information which is either compressed or uncompressed) at the receiver side. After sending the initial fragments of data, the sender sends a polling request. This process continues until the sender receives the correct reception indication from the receiver.

2. After the initial fragments of the segment are sent correctly (for example in the case of TCP it is the header information either compressed or uncompressed) the remaining fragment (payload) of the data segment is sent and a polling request is issued at the end of the transmission to receive the ACK/NACK bit map from the receiver. This is sent until the correct reception of the segment is indicated from the receiver.

3. The receiver, since it knows the condition parameter (e.g. time out value) until which it can receive the data segment (using the information obtained by interaction between the application layer and link layer), or since it knows that the error rate is too high, or that it is not possible to obtain the available resources to send the remaining fragment of the segment, it sends an acknowledgment ACK even for the segments which are received in error.

Figure 2A:
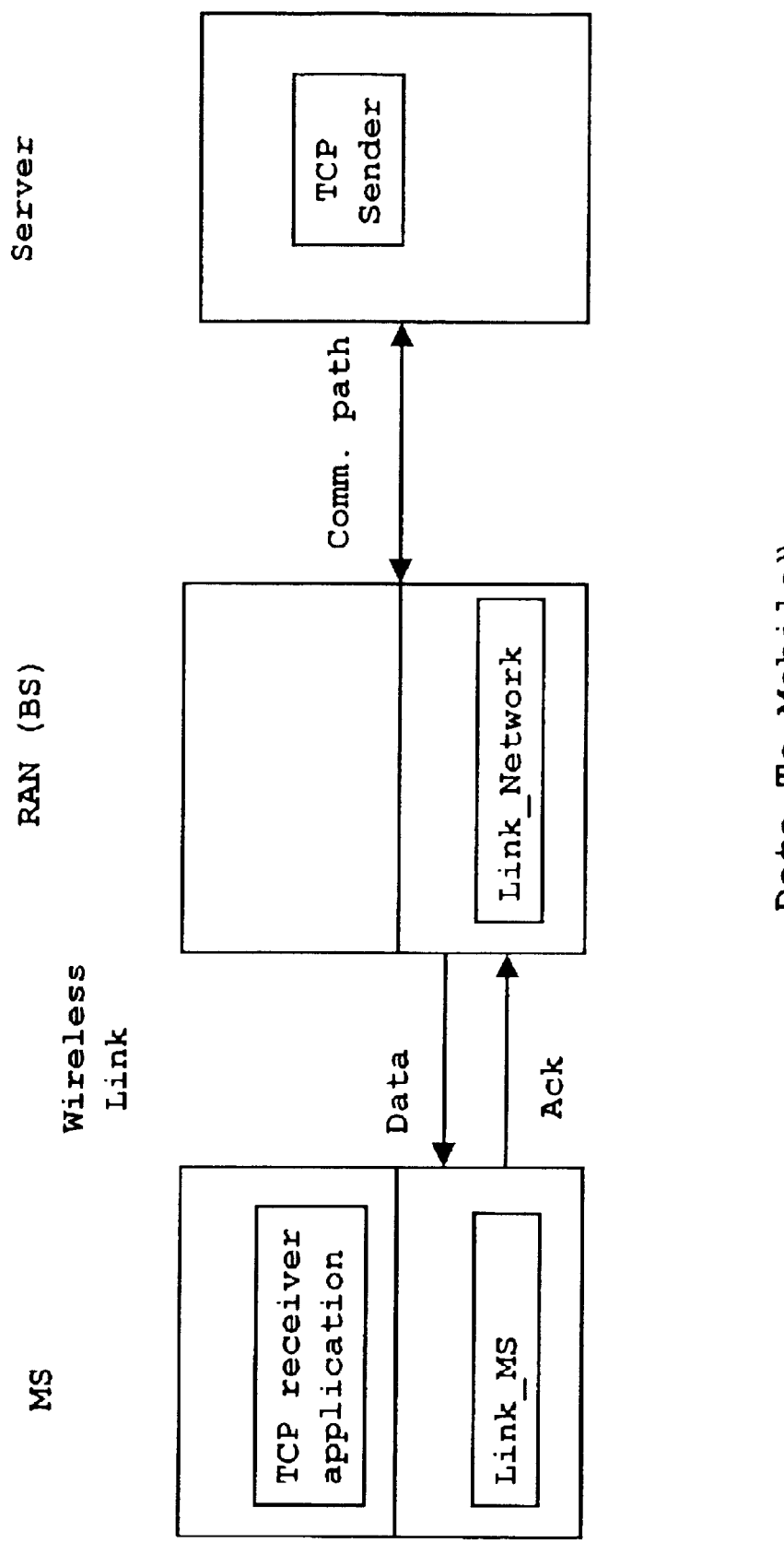

FIGS. 2A and 2B show a simplified block diagram of the entities shown in FIG. 1 for different transmission directions according to a second embodiment of the present invention. Note that for FIG. 2A, "Data to Mobile", we focus on the flow of user data sent to the mobile; the receiving end of the link is collocated with the TCP application, whereas for FIG. 2B, "Data from Mobile", we focus on the flow of user data sent from the mobile; the sending end of the link is collocated with the TCP application. "Data from Mobile" and "Data to Mobile" are not mutually exclusive. When the communication path has a wireless link, it is a combined case of "Data from Mobile" at one end and "Data to Mobile" at the other end, where considerations from both apply. For simplicity, application level acknowledgment and link level acknowledgment are shown as a single acknowledgment ACK. Other layers or entities, if present, are not shown for simplicity.

In FIGS. 2A and 2B, we consider the cases of "Data to Mobile" and "Data from Mobile", respectively, which corresponds respectively to TCP receiver and TCP sender at the mobile station MS. The "Data to Mobile" case is more common, as it applies to a TCP Client downloading information from a TCP Server. Link_MS and Link_network indicated in the Figures are respectively the link level at the MS and the network side. A Link_adapt_MS entity (not shown) is introduced for convenience, but the invention does not mandate a particular implementation. Link adapt MS (and/or Link_adapt_network and/or link_adapt_server, to be mentioned later on) as an adaptation functionality can be implemented in various ways, including being integrated with the respective link layer. Also this embodiment of the invention can be implemented as enhancements purely internal to the mobile station. A means (not shown) to exchange parameter information between TCP (application layer), the adaptation entity calculating T1, T2, etc. and the link layer is established. This can be realized through a tight integration of TCP with the lower layers, or through some open API (Application Programming Interface).

In the following, TCP is used as an example. The invention is applicable to other application protocols having the same or similar characteristics as TCP.

Case of Data to Mobile (FIG. 2A):

1. The TCP receiver (application layer) sends e.g. the estimated Round Trip Time (RTT) value to Link_adapt_MS, an entity (not shown) located in the mobile terminal MS, and/or sends e.g. the number (a threshold) of application layer segments expected (after the first set of application packets are received). Thus, setting a condition parameter of the lower one of said layers according to information (e.g. RTT, etc.) forwarded from said higher one of said layers to said lower one of said layers can be accomplished.

2. The link adaptation entity computes time limits T1, T1a, T1b and T1c according to the received information, so that setting said condition parameter according to information forwarded from said higher one of said layers to said lower one of said layers is accomplished.

T1 is roughly the maximum time allocated to the link level to transmit and/or retransmit a TCP segment. When a new TCP segment transmission is detected, a corresponding timer (monitoring T1) is started. When the timer reaches T1, Link_MS ensures that Link_network aborts the transmission/retransmission of the current segment. In addition, by the time T1 is reached, we want to have sent 3 duplicate acknowledgments to the TCP sender. Let T1a, T1b and T1c be the times when Link_MS requests the TCP receiver to send a Duplicate ack to the TCP sender.

The above paragraph specifies the meaning of variables T1a etc. In order to keep the illustration in the drawings simple and comprehensive, these variables of times were omitted in the figure, while the rest of the parameters are shown clearly in the figure.

$$T1a<T1b<T1c<=T1.$$

See below for details on T1, T1a, T1b and T1c.

3. The duplicate acknowledgments (DUP ACK's) trigger an application level retransmission of the segment at the TCP sender. This acts as an indication to the sender that the network is not congested (which is usually assumed to result in packet losses). Note that 3 DUP ACK's are triggered only if it is known that the remaining number of expected application level packets (application layer segments) is less than a threshold (assuming that the set condition parameter comprises also this feature).

Case of Data from Mobile (FIG. 2B):

1. Similarly as in the above case, the TCP sender sends the estimated Round Trip Time (RTT) value to Link_adapt_MS, an entity located in the mobile terminal.

2. That entity computes T2, the maximum time allocated to the link level to transmit and/or retransmit a TCP segment. See below for details on T2.

3. When a new TCP segment transmission is detected, a timer is started. When the timer reaches T2, and/or the amount of data still to be sent is more than a threshold and/or the network resources available are not sufficient to be able to transmit the packet in a reasonable amount of time (dependent on the set condition parameters), Link_MS aborts the transmission of the current segment.

4. The TCP sender is notified of the link level segment abort. Upon notification, the TCP sender does not go into slow start and initiates segment retransmission.

Figure 2C:
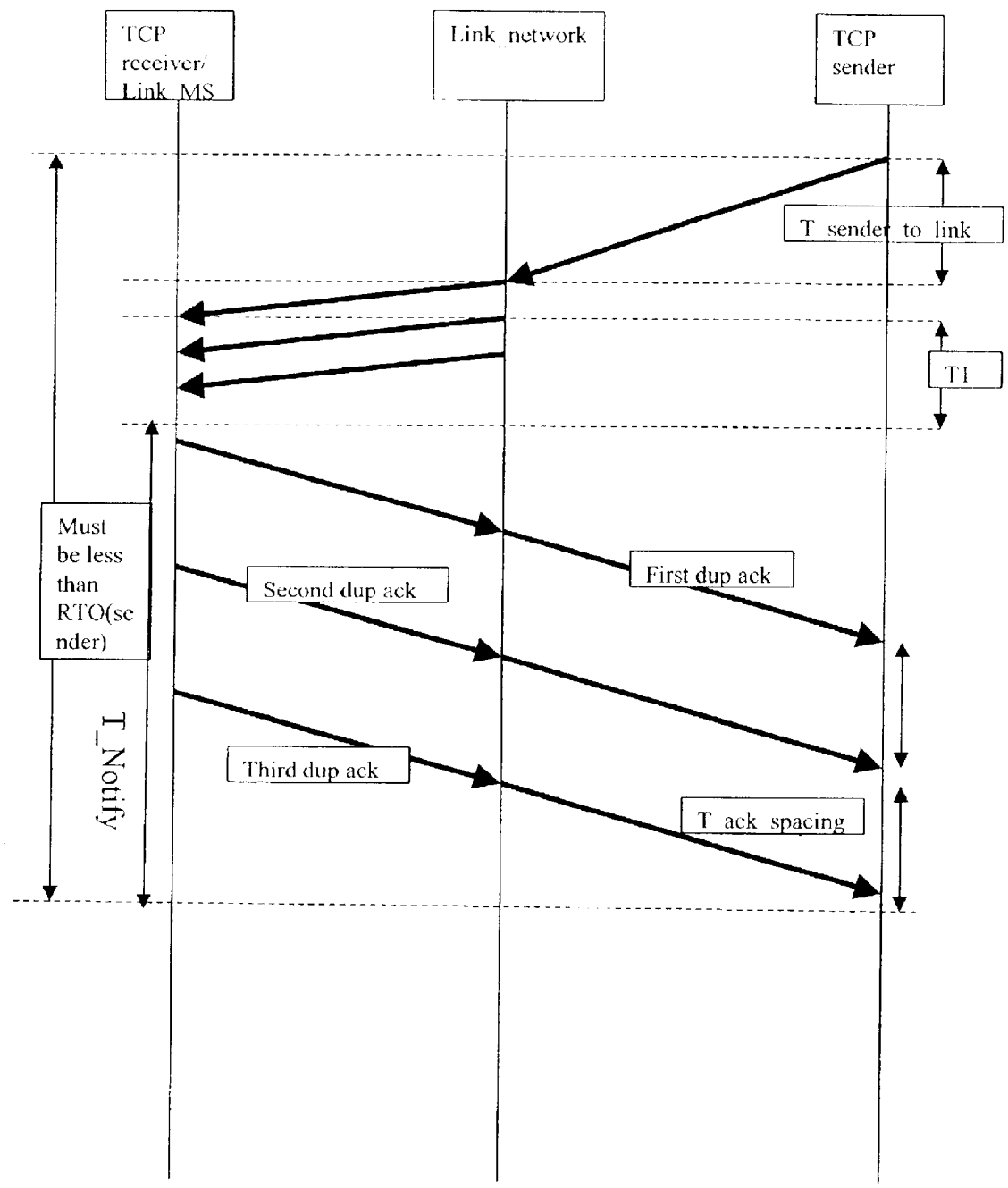
Figure 2D:
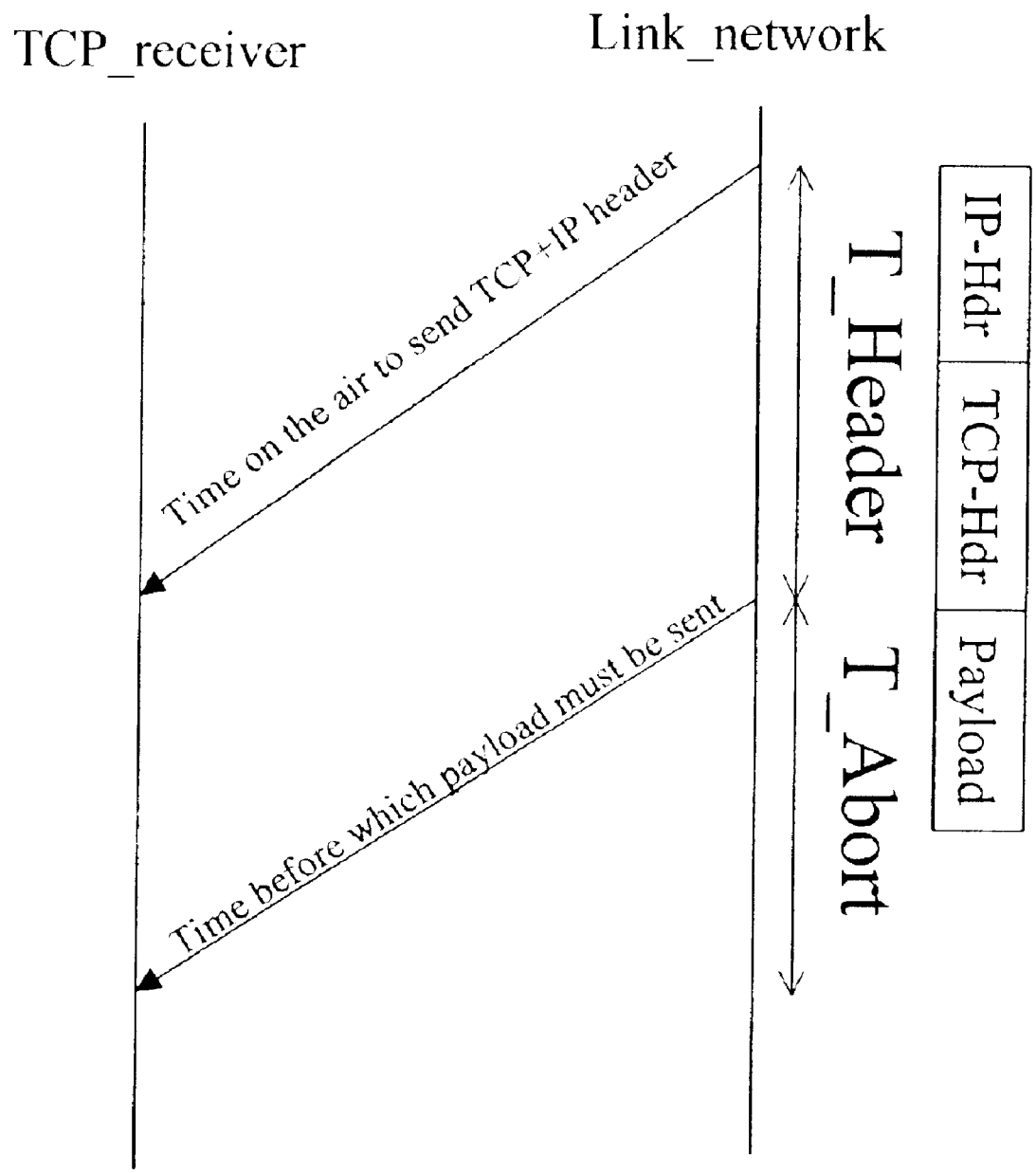

Calculation of Time Thresholds Based on Information received at lower (link) layer from the higher (application) Layer:

For the following explanations, it should be noted that as T_ack_spacing is dependent on T1a, T1b, T1c, only T_ack_spacing is shown in FIGS. 2C, 2D. T_ack is the time that it takes for an acknowledgment to reach the TCP sender from the mobile. But since we are sending, multiple acks, we also need to decide when to start sending these acks. This is done by T_ack_spacing. T1a etc. are the absolute clock times.

A) Calculation of T1:

In the case of Data to Mobile, to avoid a time-out at the TCP sender, T1 should be such that $$(T\_sender\_to\_link+T\_header+T1+T\_abort+T\_notify)<RTO(sender),$$

where

T_sender_to_link= time for TCP segment to go from TCP sender to Link_network in RAN; it includes any queuing delay at Link_network before start of segment transmission T_header= time to transmit the TCP segment header information, so the MS can detect the start of a TCP segment.

T_abort= time to determine whether to abort link level transmission of segment or not

T_notify= time to notify the TCP sender of link level abort; it is essentially the time for duplicate ack to go from TCP receiver to TCP sender RTO(sender)= retransmission timeout value at the TCP sender.

Or equivalently:

$$T1<RTO(sender)-T\_abort-(T\_sender\_to\_link+T\_header+T\_notify)$$

There are multiple ways to choose a value for T1, but it is enough to find a good lower bound of the term on the right hand side, and set T1 equal to that lower bound. For all the terms preceded with the minus sign, we look for an upper bound. One way to estimate it is as follows (this invention is applicable for other T1 choices).

T_abort:

can be estimated from the remaining length of the segment. The exact value depends on the link technology and how abort is done.

(T_sender_to_link+T_header+T_notify):

can be approximated as RTT given by the TCP receiver minus T_payload, where T_payload is the transmission time for a segment payload to go from Link_network to Link_MS. A lower bound of T_payload can be derived from the segment length information.

RTO(sender):

is estimated by Link_adapt_MS based on RTT provided by TCP receiver and using the RTO calculation algorithm standardized in RFC 2998.

Calculation of T1a, T1b, T1c:

There is some freedom to choose T1a, T1b and T1c, the only requirement is that $$T1a<T1b<T1c<=T1$$

has to be fulfilled.

One option is to send the duplicate acknowledgments as late as possible, but space them a bit to reduce congestion. For example, we can choose T1c=T1, T1b=T1−T_ack, T1a=T1b−T_ack, where T_ack is the time to send a duplicate acknowledgment.

Calculation of T2:

The same reasoning shows that T2 should be such that $$T2<RTO(sender)-(T\_sender\_to\_link+T\_abort+T\_notify),$$

where

T_sender_to_link=
time for TCP segment to go from TCP sender to Link_MS,

T_notify=
time to notify the TCP sender of link level abort,

T_abort=
time to decide whether to abort or not at the link level,

RTO(sender)=
retransmission timeout value at the TCP sender.

Again, it is enough to find a good estimate of the term on the right hand side.

RTO(sender) is known from RTT. T_sender_to_link and T_notify are likely negligible, but an upper bound can be found, based on the implementation of the MS. T_abort can also be upper bounded. Therefore T2 can be calculated.

As has been described above, this embodiment of the invention addresses the unwanted interaction problem by defining a coordination between the layers located within the mobile terminal and/or the network. According to the second embodiment of the invention, there is proposed a mechanism for the link level entity to decide whether or not to abort link level transmission or retransmission of a data segment when the time elapsed to transmit and/or retransmit that segment has exceeded a threshold. When such abort takes place, the application level is notified, so it can initiate its own retransmission without having to timeout at the application level. The link level abort threshold is calculated as a function of the retransmission timeout value of the application.

Thus, the behavior at the link level is optimized in that the link level is kept transmitting and/or retransmitting (in case of errors) up to a threshold (condition) where the application is close to timeout, then link level transmission/retransmission is controlled to stop. At that point, the application is notified so that it can itself take care of retransmission and does not timeout which otherwise would result in lower throughput.

FIGS. 2C and 2D graphically illustrates timing relations in the calculation of above mentioned timer values.

Figure 3A:
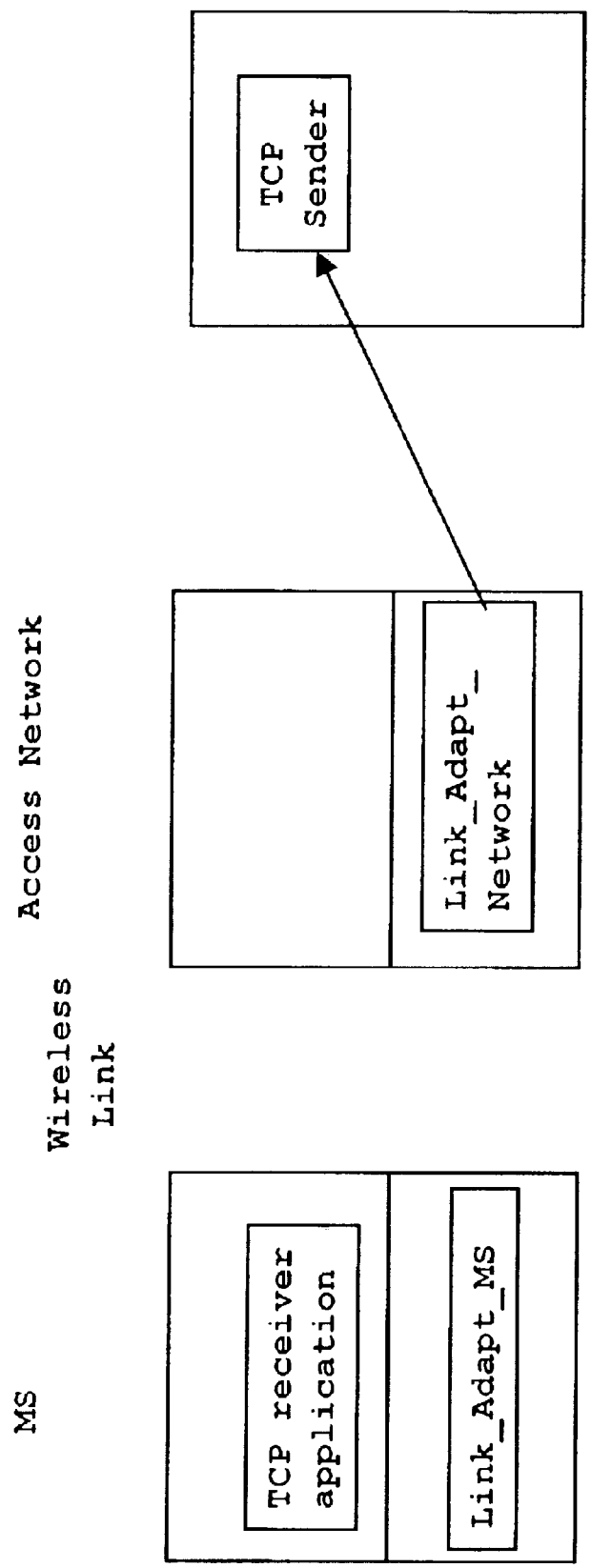
FIGS. 3A to 3C show alternative scenarios for informing the transmitter of the need for retransmission on a higher hierarchical layer.
Figure 3B:
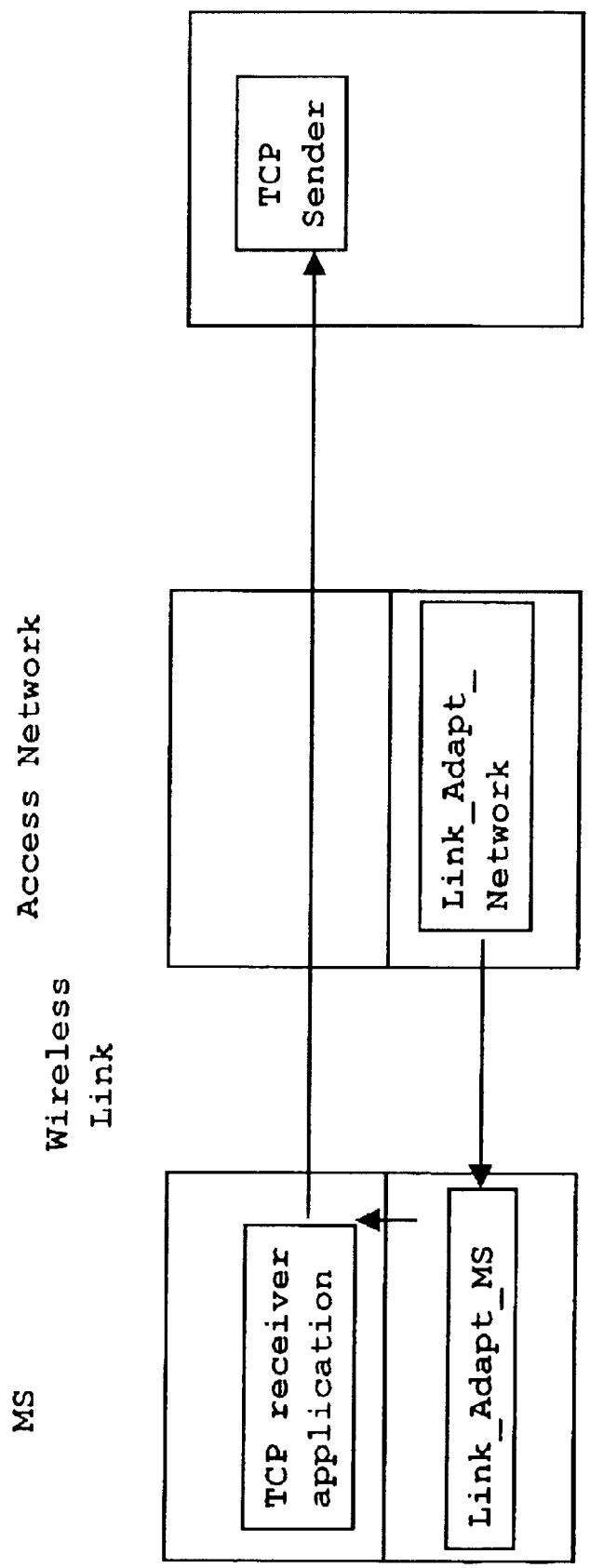
Figure 3C:
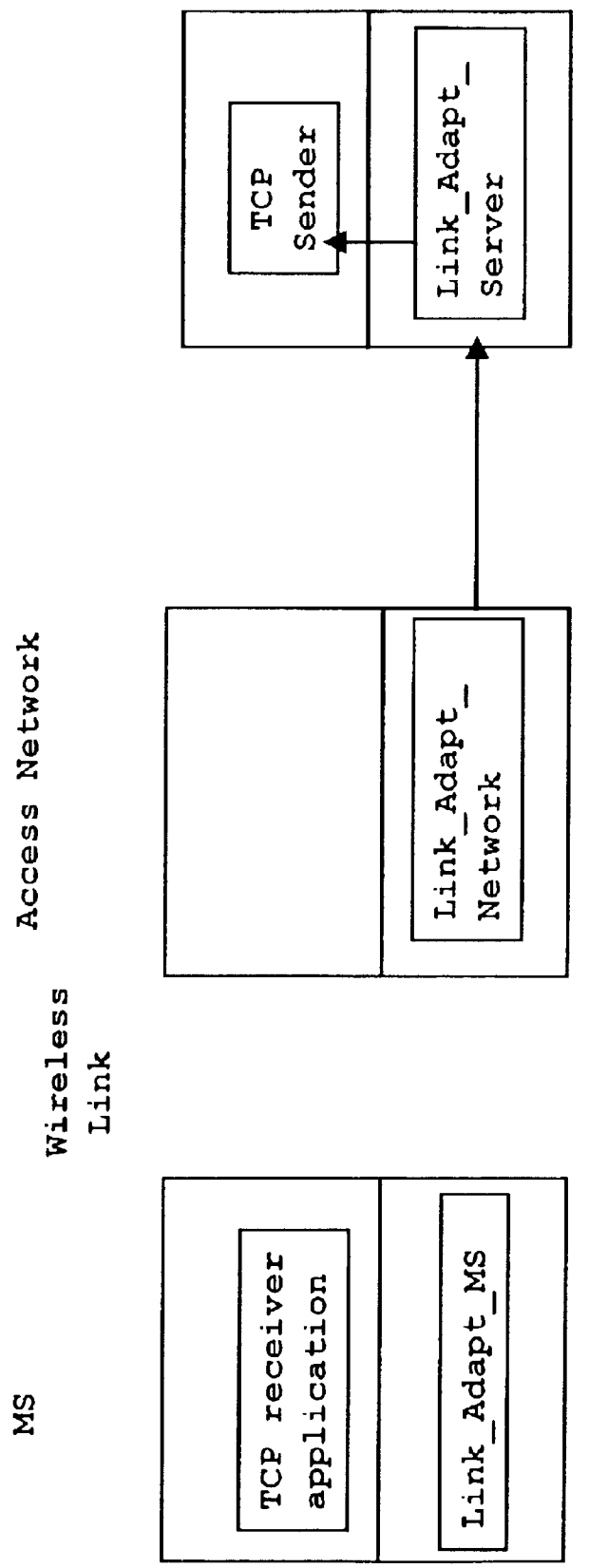

FIGS. 3A to 3C show alternative scenarios for informing the transmitter of the need for retransmission on a higher hierarchical layer.

As has been described above in connection with FIGS. 2A and 2B, the link level and the application level of the mobile terminal are coordinated. That part of the link level located in the mobile terminal is called Link_MS. Link_MS is informed of a condition parameter of the application level such as the application level timeout value. The link level can retransmit data (upon errors) up to some threshold. At the threshold, the link level is controlled to abort any ongoing transmission/retransmission and to notify the application level, so that the application level takes care of retransmission and does not time out. Link_MS is the one who knows the threshold and initiates the abort. In the case of Data to Mobile, the Link_MS is on the receiving side, so some link level mechanism is needed to allow the receiver to initiate the abort.

As will be become apparent from the subsequent description with the scenarios described in FIGS. 3A to C, however, the link level abort mechanism is not mandatory for the usefulness of this invention. Thus, the idea is more generically applicable to various link technologies. Furthermore, this solution is more robust, unlike the above one, since it is not predicated on successful signaling (e.g. TCP Duplicate Acknowledgment) transmission over the air interface. The disadvantage however is that the continued retransmission may adversely interfere with other applications. For example if there are both TCP and real-time traffic going simultaneously, then a blocked TCP connection may disrupt the real-time traffic. But with the abort mechanism, this could be avoided.

It is to be noted that the above two paragraphs are not inconsistent. If a link layer technology does have a mechanism to abort the connection, and if it is desirable, then one may abort the connection in the middle of the transmission. Some link layer technologies do not have any mechanisms to abort a connection in the middle of a packet transmission, but this limitation of the link technology does not in any way affect the usefulness or validity of the invention.

In detail, in the attached figure, we consider the case of Data to Mobile. The Data to Mobile case is more common, as it applies to a TCP Client in the MS downloading information from a TCP Server. (The implementation described with reference to FIGS. 2A&B solved the case of Data from Mobile without any drawback.)

Also in the following, TCP is used as an example. Nevertheless, this aspect of the invention is applicable to other application protocols having the same or similar characteristics as TCP. Link_MS and Link_network are respectively the link level at the MS and the network side. The following steps are performed:

1) Link_adapt_network, an entity located in the network, gets the overall Round Trip Time (RTT) value, along with RTO(sender), by some mechanism that will be described in more detail below from the application. Thus, the lower (link) layer receives information from the higher (application) layer.

2) Link_adapt_network computes T3, the maximum time allocated to the link level to transmit and/or retransmit a TCP segment. Thus, according to the received information, a condition parameter is set at the lower layer.

3) When it is detected that the link level transmission/retransmission time of a TCP segment reaches T3, Link_network controls link layer retransmission scheme and determines whether to abort the transmission of the current segment or not based upon, e.g., the amount of data remaining to be sent, the error rate on the air interface and/or the available resources.

4) At the expiry of the timer Link_adapt_network then also notifies the TCP sender (application layer) and e.g. based upon the number of application packets to be sent/received either there is an initiation of segment retransmission or not.

Three alternatives exist for notifying the TCP sender in step 4). These are depicted in FIGS. 3A to 3C, respectively.

Alternative A (FIG. 3A):

Link_adapt_network functionality notifies the TCP sender (application layer) of the timer expiry, by generating three TCP duplicate acknowledgments. Upon notification, the TCP sender initiates segment retransmission. This alternative is the fastest way to notify the TCP sender. Other advantages are that no new signaling is needed, and the method is not vulnerable to losses on the wireless link. A slight disadvantage is that it requires Link_adapt_network functionality to be aware of TCP and to track the TCP sequence number of the last acknowledgement on a per-connection basis. Also (not shown in FIG. 3A) it is possible that the Link_adapt_MS could send 3 DUP ACK's if it has the feature. The module in the network Link_adapt_network in this case would block the DUP Ack's from the MS in order not to clutter the send. Note that there are additional constraints involved in sending the DUP ACK's like the amount of offset in the sequence number of the number of packets received/sent.

Alternative B (FIG. 3B)

The link_adapt_network functionality notifies Link_adapt_MS functionality, which in turn notifies TCP receiver (i.e. the TCP application layer); TCP receiver sends three duplicate acknowledgments to TCP sender (application layer). Note that this decision includes the constraint of the remaining number of application level packets to be sent/received. This alternative requires more steps. It is also vulnerable to losses over the wireless link (which is more likely to happen, since the TCP segment retransmission was unsuccessful). Depending on the link technology, some new signaling between Link_adapt_network functionality and Link_adapt_MS functionality may be needed. Nevertheless, the advantage is that Link_adapt_network functionality does not have to be capable to generate the duplicate acknowledgment or to maintain the TCP sequence number of the last acknowledgment.

Alternative C (FIG. 3C):

Link_adapt_network functionality notifies the Link_adapt_server functionality, which in turn notifies TCP sender (application layer). This alternative requires slightly more steps than alternative A. It also requires the definition of new signaling between Link_adapt_network and Link_adapt_server functionalities, and the implementation of Link_adapt_server functionality collocated with the TCP sender (application). The advantage is that Link_adapt network functionality does not have to be capable to generate the duplicate acknowledgment or to maintain the TCP sequence number of the last acknowledgment. The method is not vulnerable to losses on the wireless link.

Calculation of T3:

To avoid a time out at the TCP sender (application level), T3 as a condition parameter on the lower (link) layer (derived according to information forwarded from the application layer to the link layer) should be such that (T_sender_to_link+T3+T_abort+T_notify)<RTO(sender)

where

T_sender_to_link= time for TCP segment to go from TCP sender to Link_network

T_abort= time to determine whether to abort at the link level or not

T_notify= time to notify the TCP sender of link level abort

RTO(sender)= retransmission timeout value at the TCP sender

Equivalenty,

T3<RTO(sender)−T_sender_to_link−T_abort−T_notify

It is enough to find a good lower bound of the term on the right hand side, and set T3 equal to that lower bound. For all the terms preceded with the minus sign, we look for an upper bound. One way to estimate is as follows.

T_abort: an upper bound can be estimated for a given link technology

If alternative A is used (T_sender_to_link+T_notify) can be approximated as RTT−RTT_link+2*T_ack, where RTT_link is the round trip time over the link, and T_ack is the time to send a duplicate ack.

RTT_link is estimated locally by the Link_adapt_network functionality; the specifics depend on the link technology.

If alternative B is used (T_sender_to_link+T_notify) can be approximated as RTT+2*T_ack.

If alternative C is used (T_sender_to_link+T_notify) can be approximated as RTT−RTT_link+2*T_ack There are at least 2 options for how Link_adapt_network gets the overall Round Trip Time (RTT) value, along with RTO(sender) in step 1 further above:

Option 1

Get RTT from the TCP sender (application layer); the TCP sender can send its RTT along with RTO(sender), or Link_adapt_network can calculate RTO(sender) from the RTT, using the standardized RTO computation algorithm. The information may or may not be conveyed through Link_adapt_server. Some new signaling is needed for this.

Option 2

Get RTT from the TCP receiver; normally, the RTT values seen at the TCP sender and TCP receiver are close, so RTT at the receiver can be a good approximation of RTT at the sender; Link_adapt_network functionality can calculate RTO(sender) from the RTT, using the standardized RTO computation algorithm. The information may or may not be conveyed through Link_adapt_MS. Some new signaling is needed. The signaling can be implemented on a proprietary basis if both the MS and access network (e.g. BS) are from the same manufacturer.

The Link_adapt_network, Link_adapt_MS and Link_adapt_server entities are introduced for convenience to describe the concepts, but the invention does not mandate a particular implementation. Link_adapt_network can be implemented in the access network (e.g. RAN). Link_adapt server can be an upgrade to existing servers to make them more "friendly" to cellular environment, or can be implemented in proxy type servers. Link_adapt_MS is purely internal to the MS. In those cases where new signaling is needed, implementation can be proprietary to the manufacturer, when both termination points are from the same manufacturer. These termination points can be the MS, access network and/or the TCP server.

Accordingly, from the above detailed description it will be appreciated that

1) TCP has two mechanisms for loss detection and recovery, namely, a) timeout and b) reception of 3 duplicate acknowledgements.

2) The timeout based mechanism works in all the cases, but the connection pays a heavy price for this. After a timeout, the TCP sender's data rate is reduced to one packet. In addition, if the timeout is caused unnecessarily, the sender sends data twice, thus further degrading the throughput.

3) The 3 duplicate acknowledgement, however, works only in those cases when the receiver can generate 3 duplicate acknowledgments (this requires at least 3 data segments in the base station queue) and the loss of a given segment occurs only once. In addition, the loss must get recovered within the RTO. But the advantage of 3 duplicate acknowledgments is that it does not retransmit all the data, but only that part which was lost. In addition, it does not reduce the data rate to one segment.

4) What this invention solves is that if the sender cannot receive 3 duplicate acknowledgments, and the Base Station knows this fact because there were very few packets in its transmission queue, or due to other reasons, then instead of waiting for the timeout to occur, the Base Station can generate these three duplicate acknowledgment and prevent a timeout.

5) Since this method is not fool proof, because the TCP sender may still timeout, as a further optimization we the implementation can also eliminate redundant data if (if and only if) there is a timeout. This will not prevent the loss of throughput due to reduced data rate, but this will save a lot of radio resources.

Although herein above the aspects of the present invention have mainly been described with a descriptive focus on signaling and method steps involved, it is clear that the present invention also concerns correspondingly adapted receivers and transmitters constituting a communication network which may carry out the method according to the present invention.

Accordingly, as has been described herein above the present invention concerns a data communication method for communicating packetized data via an interface between a transmitter and a receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, the method comprising the steps of initializing the retransmission scheme of the lower one of said layers by setting a condition parameter, wherein fulfilling the condition defined by the condition parameter represents an indication as to how to control the retransmission scheme, wherein initializing comprises setting said condition parameter of the lower one of said layers according to information forwarded from said higher one of said layers to said lower one of said layers, transmitting packet data from the transmitter via the interface to the receiver according to the retransmission scheme of said lower one of said layers, detecting that said condition is fulfilled during transmitting, and controlling said retransmission scheme of said lower one of said layers in response to said detecting. Also, a corresponding system constituted by correspondingly adapted transmitters and receivers is proposed.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A data communication method
    for communicating packetized data
        via an interface
            between a transmitter and a receiver, wherein communication relies on a layered communication protocol stack
            comprising at least two protocol layers of different hierarchy level,
            wherein at least data communication on a lower one of said layers
                adopts a retransmission scheme for data packets for which an acknowledgment of receipt was not received at the transmitter,
the method comprising the steps of:
    initializing the retransmission scheme of the lower one of said layers by setting a condition parameter, wherein fulfilling the condition defined by the condition parameter represents an indication as to how to control the retransmission scheme,
    wherein
    initializing comprises
        setting said condition parameter of the lower one of said layers
            according to information forwarded from said higher one of said layers to said lower one of said layers,
    transmitting packet data from the transmitter via the interface to the receiver according to the retransmission scheme of said lower one of said layers,
    detecting that said condition is fulfilled during transmitting, and
    controlling said retransmission scheme of said lower one of said layers in response to said detecting.

2. A method according to claim 1, wherein
said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received.

3. A method according to claim 1, wherein said controlling comprises:
    acknowledging receipt of the packet data; and
    continuing transmission of the subsequent packet via the lower one of said layers.

4. A method according to claim 2, wherein said controlling comprises:
    determining to either abort or not the transmission via the lower one of said layers, and;
    informing the higher one of said layers about a need for retransmission.

5. A data communication system,
    comprising at least a transmitter and a receiver,
    and being adapted to communicate packetized data via an interface between said transmitter and said receiver,
    wherein communication relies on a layered
    communication protocol stack
        comprising at least two protocol layers of different hierarchy level,
        wherein at least data communication on a lower one of said layers
            adopts a retransmission scheme for data packets for which an acknowledgment of receipt was not received at the transmitter,
    wherein
        at the receiver side, the receiver is configured in terms of the retransmission scheme of the lower one of said layers by a set condition parameter,
            wherein fulfilling the condition defined by the condition parameter represents an indication as to how to control the retransmission scheme, and
            wherein said configured condition parameter of the lower one of said layers is set according to properties of said higher one of said layers, said transmitter is adapted to transmit packet data
    via the interface to the receiver according to the retransmission scheme of said lower one of said layers,
    said receiver comprises a detecting means adapted to detect that said condition is fulfilled during reception of transmitted packet data, and said receiver comprises a control means adapted to control said retransmission scheme of said lower one of said layers in response to an output of said detecting means.

6. A system according to claim 5, wherein said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received.

7. A system according to claim 5, wherein said control means is adapted to acknowledge receipt of the packet data to thereby continue transmission of the subsequent packet data via the lower one of said layers.

8. A system according to claim 5, wherein said control means is adapted to determine to either abort or not the transmission via the lower one of said layers, and:

inform the higher one of said layers about a need for retransmission.

9. A receiver for use with a data communication system adapted to communicate packetized data via an interface between a transmitter and said receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, comprising configuration means adapted to configure the receiver in terms of the retransmission scheme of the lower one of said layers by a set condition parameter, wherein fulfilling the condition defined by the condition parameter represents an indication as to how to control the retransmission scheme, and wherein said configuration means is adapted to set said configured condition parameter of the lower one of said layers according to properties of said higher one of said layers, receiving means adapted to receive packet data transmitted from said transmitter via the interface to the receiver according to the retransmission scheme of said lower one of said layers, and detecting means adapted to detect that said condition is fulfilled during reception of transmitted packet data, and control means adapted to control said retransmission scheme of said lower one of said layers in response to an output of said detecting means.

10. A receiver according to claim 9, wherein said condition parameter comprises at least one of a lapse of a specified time, a function of the radio conditions, a function of the amount of data remaining to be sent/received to complete a segment of data transmission, a function of the amount of system load, a function of the sequence number of the packet received/sent, and a function of the number of application level packets remaining to be sent/received.

11. A receiver according to claim 9, wherein said control means is adapted to acknowledge receipt of the packet data to the transmitter to thereby continue transmission of the subsequent packet data via the lower one of said layers.

12. A receiver according to claim 9, wherein said control means is adapted to determine to either abort or not the transmission via the lower one of said layers, and;

inform the higher one of said layers about a need for retransmission.

13. A transmitter for use with a data communication system adapted to communicate packetized data via an interface between said transmitter and a receiver, wherein communication relies on a layered communication protocol stack comprising at least two protocol layers of different hierarchy level, wherein at least data communication on a lower one of said layers adopts a retransmission scheme for data packets for which an acknowledgment of receipt was not received at the transmitter, comprising receiving means adapted to receive a feedback from external, and control means adapted to control said retransmission scheme of said lower one of said layers in response to said received feedback.

14. A transmitter according to claim 13, wherein said control means is adapted to continue transmission of the subsequent packet data via the lower one of said layers using said retransmission scheme, if the received feedback was a positive acknowledgment.

15. A transmitter according to claim 13, wherein said control means is adapted to abort transmission via the lower one of said layers, and perform retransmission on the higher one of said layers, if the received feedback indicates that the retransmission scheme on the lower layer is to be stopped.

16. A method according to claim 2, wherein said controlling comprises stopping additional duplicate acknowledgments from reaching the application.

17. A system according to claim 6, wherein said control means is adapted to stop additional duplicate acknowledgments from reaching the application.

18. A receiver according to claim 9, wherein said control means is adapted to stop additional duplicate acknowledgments from reaching the application.

19. A transmitter according to claim 13, wherein said control means is adapted to stop additional duplicate acknowledgments from reaching the application.

* * * * *